(12) United States Patent
Yumita et al.

(10) Patent No.: US 10,252,621 B2
(45) Date of Patent: Apr. 9, 2019

(54) POWER SOURCE DEVICE FOR VEHICLE

(71) Applicant: TOYOTA JIDOSHA KABUSHIKI KAISHA, Toyota-shi, Aichi-ken (JP)

(72) Inventors: Osamu Yumita, Seto (JP); Daisuke Ueo, Nagoya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 229 days.

(21) Appl. No.: 14/934,871

(22) Filed: Nov. 6, 2015

(65) Prior Publication Data
US 2016/0137070 A1 May 19, 2016

(30) Foreign Application Priority Data
Nov. 13, 2014 (JP) ................. 2014-230668

(51) Int. Cl.
*B60L 1/00* (2006.01)
*B60L 11/02* (2006.01)
*B60L 11/18* (2006.01)
*H02M 3/04* (2006.01)
*H02M 7/44* (2006.01)

(52) U.S. Cl.
CPC .............. *B60L 11/02* (2013.01); *B60L 1/006* (2013.01); *B60L 11/1809* (2013.01); *B60L 11/1842* (2013.01); *H02M 3/04* (2013.01); *H02M 7/44* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
CPC ................................ B60L 11/18; B60L 1/006
USPC ................................................. 307/9.1–10.1
See application file for complete search history.

(56) References Cited

U.S. PATENT DOCUMENTS

| 7,832,507 B2 | 11/2010 | Nakamura et al. |
| 8,712,621 B2 | 4/2014 | Saito et al. |
| 8,860,361 B2 | 10/2014 | Fukuzawa |
| 9,126,486 B2 * | 9/2015 | Kinomura ............... B60L 1/006 |

(Continued)

FOREIGN PATENT DOCUMENTS

| CN | 102577022 A | 7/2012 |
| JP | 2004-236472 A | 8/2004 |

(Continued)

*Primary Examiner* — Adi Amrany
(74) *Attorney, Agent, or Firm* — Finnegan, Henderson, Farabow, Garrett & Dunner, LLP

(57) ABSTRACT

A power source device for a vehicle may include: a power source; a DC outlet which may feed power from the power source to an external device external to the vehicle; a service receptacle which may be provided, within a vehicle interior, separately from the DC outlet; an operator by which a user may request power feed from the DC outlet to the external device; and a vehicle ECU which may control power supply from the power source to the DC outlet and the service receptacle. When the vehicle ECU receives, from the operator, an input requesting the power feed to the external device, the vehicle ECU may stop the power supply to the service receptacle and cause the DC outlet to perform the power supply. With the configuration described above, the possibility of failure to turn off an in-vehicle electric apparatus is reduced.

8 Claims, 3 Drawing Sheets

(56) References Cited

U.S. PATENT DOCUMENTS

| | | |
|---|---|---|
| 2009/0039839 A1 | 2/2009 | Noguchi et al. |
| 2011/0246013 A1* | 10/2011 | Yee ..................... B60L 11/1859 701/22 |
| 2012/0019190 A1* | 1/2012 | Jones .................... H01M 10/44 320/101 |
| 2012/0141895 A1* | 6/2012 | Kwon ............... H01M 8/04037 429/429 |
| 2012/0193983 A1 | 8/2012 | Yukizane et al. |
| 2014/0035512 A1* | 2/2014 | Kamachi .............. H02J 7/0042 320/103 |
| 2014/0336855 A1* | 11/2014 | Kwon ................ B60L 11/1885 701/22 |
| 2015/0224889 A1 | 8/2015 | Ono |
| 2015/0263560 A1 | 9/2015 | Ono et al. |
| 2015/0375621 A1 | 12/2015 | Ono et al. |

FOREIGN PATENT DOCUMENTS

| | | |
|---|---|---|
| JP | 2009-043548 A | 2/2009 |
| JP | 4715466 | 7/2011 |
| JP | 2013-110912 A | 6/2013 |
| JP | 2013-198286 | 9/2013 |
| JP | 2013-198288 | 9/2013 |
| JP | 2013-198292 | 9/2013 |
| JP | 2013-207860 | 10/2013 |
| JP | 2014-090525 A | 5/2014 |
| JP | 5582183 | 9/2014 |
| JP | 2014-204454 A | 10/2014 |
| WO | WO 2014/068782 A1 | 5/2014 |
| WO | WO 2014/147781 A1 | 9/2014 |

\* cited by examiner

POWER SOURCE DEVICE FOR VEHICLE

This nonprovisional application is based on Japanese Patent Application No. 2014-230668 filed on Nov. 13, 2014 with the Japan Patent Office, the entire contents of which are hereby incorporated by reference.

BACKGROUND

Technical Field

The present disclosure relates to a power source device for a vehicle, such as a power source device for a vehicle capable of feeding electric power from the vehicle to an external device.

Description of Background Art

There are known power feed systems which use an electrically powered vehicle as a power source, and perform power conversion using an external power feed device to supply electric power to a house and electric appliances. For example, Japanese Patent Laying-Open No. 2013-198288 describes a power feed system in which an external power feed device is connected to an electrically powered vehicle. In the system, direct current (DC) power output from the electrically powered vehicle to the external power feed device is converted into alternating current (AC) power using an inverter of the external power feed device, and the AC power is supplied to an external load.

A service receptacle may be provided within a vehicle interior for a user's convenience. The above publication does not consider as to whether or not to allow a service receptacle to be used during power feed to the outside of the vehicle in this case. It is often the case that no one is present within the vehicle interior during the power feed to the outside. If power feed from the service receptacle is allowed in such a case, for example when the user forgets to turn off an apparatus connected to the service receptacle, power feed may be continued without being noticed by the user, and the apparatus may be operated in an inappropriate state and broken down.

Further, if power is output from the service receptacle and exceeds a limit value of a total output current of the vehicle during the power feed to the outside of the vehicle, the power feed to the outside of the vehicle may be stopped.

SUMMARY

Embodiments of the present disclosure may provide a vehicle capable of feeding power to the outside of the vehicle, with reduced possibility of failure to turn off an in-vehicle electric apparatus due to carelessness.

In summary, the present disclosure is directed to a power source device for a vehicle, which may include: a power source; a first connector for feeding power from the power source to an external device external to the vehicle; a second connector provided, within a vehicle interior, separately from the first connector; an operator by which a user requests power feed from the first connector to the external device; and an electronic control unit which controls power supply from the power source to the first connector and the second connector. When the electronic control unit receives, from the operator, an input requesting the power feed to the external device, the electronic control unit may stop the power supply to the second connector and causes the first connector to perform the power supply.

It is often the case that no one is present within the vehicle interior during the power feed to the outside. With the control as described above, even if an electric apparatus is connected to the second connector and is left in an operated state within the vehicle interior, the above control can prevent that the power feed to the electric apparatus is continued without being noticed by the user, and the apparatus is operated in an inappropriate state.

During the power feed from the first connector to the external device, the electronic control unit may further disable power supply from the second connector even if the electronic control unit receives, from the operator, a request to use the second connector.

There may be a case where an upper limit of electric power which can be output as an entire device is set for the power source device for the vehicle, if electric power is output from the second connector to the electric apparatus within the vehicle interior during the power feed to the external device in such a case, the external device in operation may be stopped due to the limited electric power. With the control as described above, during the power feed from the first connector to the external device, even if a request to supply electric power to the second connector is made later, electric power may not be supplied to the second connector. Accordingly, this can avoid a situation in which the external device is stopped.

The power source device for the vehicle may further include a power detector which detects power supplied from the first connector to the external device. When the power detected by the power detector exceeds a predetermined value, the electronic control unit may limit power supply from the first connector.

With the configuration described above, the electronic control unit can determine whether to feed power to the external device as requested or to limit or stop power feed, while monitoring electric power.

The power source may be a DC power source. The power source device for the vehicle may further include a DC output which receives a voltage of the DC power source and outputs a DC voltage for power feed to the first connector, and an AC output which receives the voltage of the DC power source to generate an AC voltage, and outputs the AC voltage to the second connector. The AC output may include an inverter. The DC output may include a power feed relay which connects the DC power source and the first connector. When the electronic control unit receives, from the operator, the input requesting the power feed to the external device, the electronic control unit may stop an operation of the inverter and make the power feed relay conductive.

With the configuration as described above, the electronic control unit can cause the AC output to stop an output of the AC voltage, and can cause the DC output to output the DC voltage for power feed. It should be noted that, in order to cause the AC output to stop an output of the AC voltage, a relay may be provided at an exit of the AC output to interrupt the output.

The power source may include a secondary battery, and may include a fuel cell for charging the secondary battery.

With the configuration described above, even if the secondary battery has a small battery capacity, the power feed to the external device can be continued as long as the fuel cell is replenished with fuel.

Present embodiments may avoid a situation in which, during the power feed to the outside of the vehicle, an in-vehicle electric apparatus continues operation without being noticed by the user.

The foregoing and other features, aspects and advantages of the present disclosure will become more apparent from the following detailed description when taken in conjunction with the accompanying drawings.

DETAILED DESCRIPTION

Figure 1:
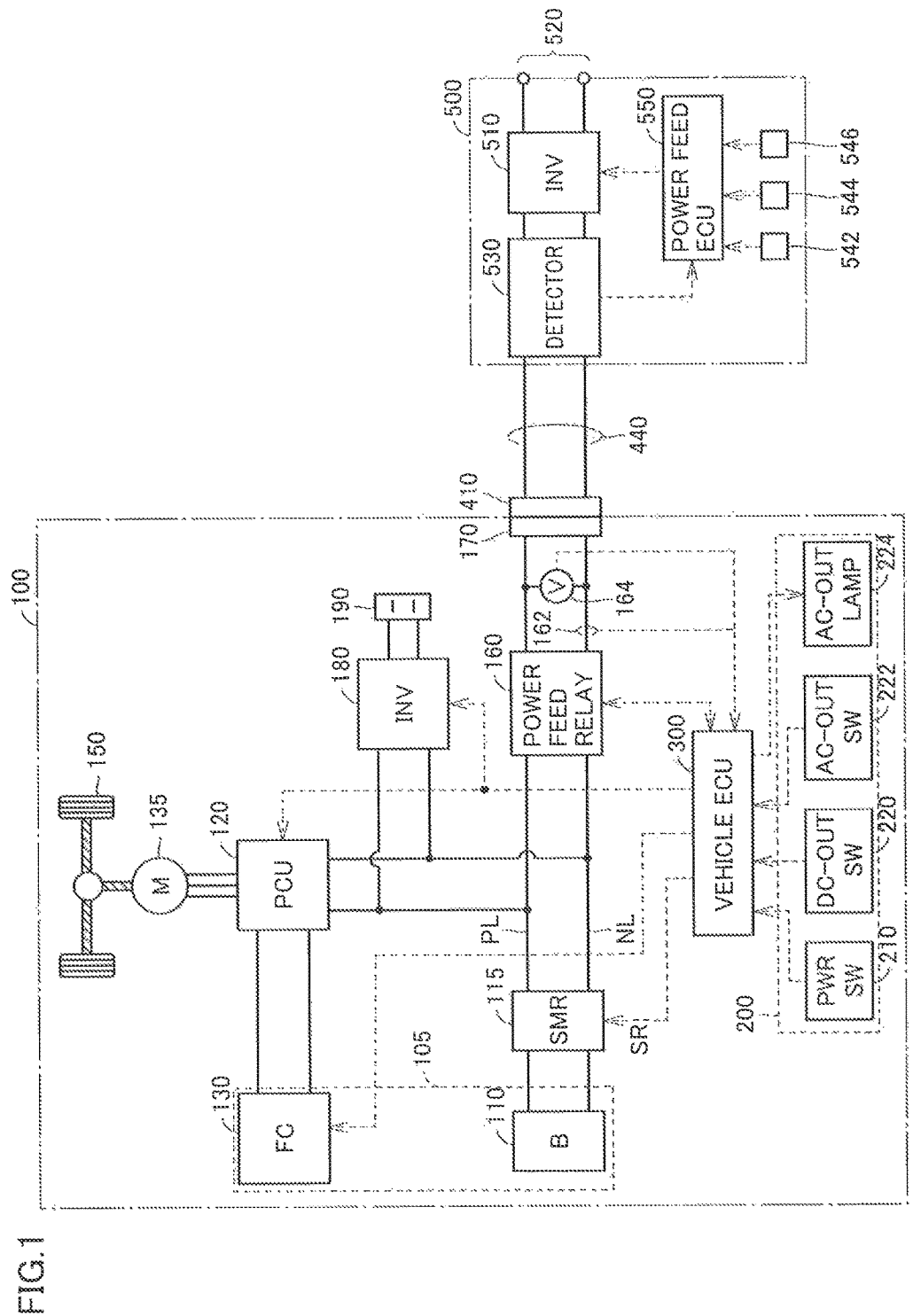
FIG. 1 is a view showing a configuration off vehicle equipped with a power source device for a vehicle in accordance with an exemplary embodiment, and a configuration of an external device connected to the vehicle.

An embodiment of the present disclosure will be described in detail with reference to the drawings, it should be noted that identical or corresponding parts will be designated by the same reference numerals, and the description thereof will not be repeated.

FIG. 1 is a view showing a configuration of a vehicle equipped with a power source device for a vehicle in accordance with the present embodiment, and a configuration of an external device connected to the vehicle.

Referring to FIG. 1, a vehicle 100 includes a power source 105, a system main relay (SMR) 115, a power control unit (PCU) 120, a motor 135, drive wheels 150, and a vehicle electronic control unit (ECU) 300 as a control device. Power source 105 includes a vehicle-mounted battery 110 and a fuel cell 130. PCU 120 includes a converter, an inverter, and a capacitor, although they are not shown.

An external device 500 includes a detector 530 which detects electric leakage, an inverter 510, a power feed start switch 542, a power feed stop switch 544, an emergency stop switch 546, and a power feed ECU 550 which controls inverter 510.

Vehicle-mounted battery 110 is connected to PCU 120 via a positive power line PL and a negative power line NL. Vehicle-mounted battery 110 supplies electric power for generating a drive force for vehicle 100 to PCU 120. Vehicle-mounted battery 110 also stores electric power regenerated by motor 135. The output of vehicle-mounted battery 110 is, for example, approximately 200 V.

Vehicle-mounted battery 110 includes a voltage sensor and a current sensor which are not shown, and outputs a voltage VB and a current IB of vehicle-mounted battery 110 detected by these sensors to vehicle ECU 300.

One relay included in SMR 115 is connected between a positive electrode of vehicle-mounted battery 110 and positive power line PL connected to PCU 120, and the other relay is connected between a negative electrode of vehicle-mounted battery 110 and negative power line NL. Based on a control signal SR from ECU 300, SMR 115 switches between supply and interruption of electric power between vehicle-mounted battery 110 and PCU 120.

PCU 120 is an electronic control unit including a boost converter which converts a voltage of fuel cell 130 and a voltage of vehicle-mounted battery 110 into a DC voltage for driving the motor, and an inverter which receives the DC voltage for driving the motor and drives motor 135. The inverter inside PCU 120 converts DC power into AC power and drives motor 135, based on a control signal from vehicle ECU 300.

Motor 135 is an AC rotating electrical machine, and is, for example, a permanent magnet-type synchronous motor including a rotor having a permanent magnet embedded therein.

The drive torque of motor 135 is transmitted to drive wheels 150 and causes vehicle 100 to travel. During regenerative braking of vehicle 100, motor 135 can generate electric power using the rotational force of drive wheels 150. Then, the generated electric power is converted by PCU 120 into charging power for vehicle-mounted battery 110.

It should be noted that, although an example in which vehicle 100 is a fuel cell vehicle has been described, vehicle 100 may be a hybrid vehicle. In that case, vehicle 100 further includes an engine and a power generator. The power generator can generate electric power by the rotation of the engine, and can charge vehicle-mounted battery 110 using this generated electric power. Vehicle 100 may also be an electric vehicle not equipped with an engine.

In recent years, electric vehicles, hybrid vehicles, and fuel cell vehicles have attracted attention as power source devices. These vehicles are equipped with a large-capacity vehicle-mounted battery for driving each vehicle, and the hybrid vehicles and the fuel cell vehicles also have a power generating function. Accordingly, feeding power from these vehicles to external equipment, electric apparatus, and the like is under consideration.

Since a large amount of power can be generated in these fuel cell vehicles and the like, these vehicles not only can supply power to equipment and the like external to each vehicle, but also can be provided with a service receptacle having a relatively large output within a vehicle interior.

The power source device for the vehicle in accordance with the present embodiment includes power source 105, an AC output such as inverter 180 which receives a voltage of power source 105 and outputs an AC voltage, a service receptacle 190 provided within a vehicle interior, a DC output such as power feed relay 160 which receives the voltage of power source 105 and outputs a DC voltage for power feed, a DC outlet 170 as a DC connector for feeding the DC voltage for power feed to external device 500 external to the vehicle, an operator 200 through which a user requests power feed from DC outlet 170 to external device 500, and vehicle electronic control unit (ECU) 300 which controls the AC output (inverter 180) and the DC output (power feed relay 160).

Service receptacle 190 is an AC connector provided separately from DC outlet 170 for feeding an AC voltage to an AC electric apparatus (for example, a hair drier, a hot plate, an electric rice cooker, a mobile terminal charger, or the like).

External device 500 is connected to DC outlet 170 via a connector 410 and a power cable 440. Power feed ECU 550 controls inverter 510 in accordance with the result of the detection of electric leakage by detector 530 and operating states of power feed start switch 542, power feed stop switch 544, and emergency stop switch 546. An output unit 520 may be connected to a switchboard or the like of a house, or to an AC electric apparatus.

Power source 105 on the vehicle side includes vehicle-mounted battery 110 and fuel cell 130 for charging vehicle-mounted battery 110. Vehicle-mounted battery 110 is an electric power storing element configured to be chargeable and dischargeable. Vehicle-mounted battery 110 is configured to include a secondary battery such as, for example, a lithium ion battery, a nickel hydride battery, or a lead storage battery, or a power storage element such as an electric double layer capacitor.

With the configuration described above, even if vehicle-mounted battery 110 has a small battery capacity, the power feed to external device 500 can be continued as long as fuel cell 130 is replenished with fuel.

Operator 200 includes a power switch 210, a DC-OUT switch 220, an AC-OUT switch 222, and an AC-OUT lamp 224 integrated with AC-OUT switch 222.

Power switch 210 is a switch for starting an electric traveling system for the vehicle. For example, when power switch 210 is pressed once with a brake pedal not shown) not being operated, the operation mode of the vehicle shifts to an accessory mode (Acc mode) in which some electrical components such as an audio apparatus can be used. Further, when power switch 210 is pressed twice, the operation mode of the vehicle shifts to an IG-ON mode in which all electrical components can be used. When power switch 210 is pressed with the brake pedal being depressed, the vehicle enters a state where motor 135 can be driven by PCU 120 (Ready-ON).

AC-OUT switch 222 is a switch for requesting AC in-vehicle power feed from service receptacle 190. When AC-OUT switch 222 is operated in the IG-ON mode, vehicle ECU 300 connects system main relay 115 and power feed relay 160 together, and operates inverter 180 to start supply of AC 100 V to service receptacle 190. While vehicle ECU 300 operates inverter 180, vehicle ECU 300 turns on AC-OUT lamp 224.

DC-OUT switch 220 is a switch for requesting power feed to external device 500. When DC-OUT switch 220 is operated in the IG-ON mode, vehicle ECU 300 connects system main relay 115 and power feed relay 160 at the same time, and starts DC external power feed from DC outlet 170 to external device 500.

In this case, it is necessary to consider whether to allow service receptacle 190 to be used during power feed to the outside of the vehicle. It is often the case that no one is present within the vehicle interior during the power feed to the outside. If power feed from service receptacle 190 having a relatively large output is allowed in such a case, for example when the user forgets to turn of an electric apparatus or the like with being connected to the service receptacle, power feed may be continued without being noticed by the user, and the apparatus may be operated in an inappropriate state and broken down. In particular, attention should be paid when the electric apparatus is an apparatus having a large power consumption (such as a heating apparatus).

Thus, in the present embodiment, when a request for power feed made by an operation of AC-OUT switch 222 and a request for power feed made by an operation of DC-OUT switch 220 conflict with each other, vehicle ECU 300 gives priority to the operation of DC-OUT switch 220, as illustrated later with reference to the flowcharts.

When vehicle ECU 300 receives, from operator 200, an input requesting power feed to external device 500, vehicle ECU 300 causes inverter 180 to stop an output of the AC voltage, and makes power feed relay 160 conductive to cause the DC voltage for power feed to be output to DC outlet 170.

It is often the case that no one is present within the vehicle interior during the power feed to the outside. With the control as described above, even if an AC electric apparatus (for example, a hair drier, a hot plate, an electric rice cooker, a mobile terminal charger, or the like) is connected to service receptacle 190 and is left in an operated state, the above control can prevent that the power feed to the AC electric apparatus is continued without being noticed by the user, and the apparatus is operated in an inappropriate state.

The AC output may include inverter 180, a relay not shown, and the like, the DC output includes power feed relay 160 which connects power source 105 and DC outlet 170, and when vehicle ECU 300 receives, from operator 200, an input requesting power feed to external device 500, vehicle ECU 300 stops an operation of inverter 180 and makes power feed relay 160 conductive.

With the configuration as described above, vehicle ECU 300 can cause the AC output (inverter 180) to stop an output of the AC voltage, and cause the DC output (power feed relay 160) to output the DC voltage for power feed. It should be noted that, in order to cause inverter 180 to stop an output of the AC voltage, a relay may be provided at an exit of inverter 180 to interrupt the output.

During the power feed from DC outlet 170 to external device 500, vehicle ECU 300 may disable an output of the AC voltage from the AC output (inverter 180) even if vehicle ECU 300 receives, from operator 200, a request to use service receptacle 190.

Further, there may be a case where an upper limit of electric power which can be output as an entire device is set for the power source device for the vehicle. If electric power is output from the AC output (inverter 180) to the AC electric apparatus during the power feed to external device 500 in such a case, external device 500 in operation may be stopped due to the limited electric power. With the control as described above, during the power feed from DC outlet 170 to external device 500, even if a request to supply electric power to the AC electric apparatus connected to service receptacle 190 is made later, the requested electric power is not supplied to the AC electric apparatus. Accordingly, this can avoid a situation in which external device 500 is stopped.

The power source device for the vehicle may further include a current sensor 162 and a voltage sensor 164 which detect power supplied from DC outlet 170 to external device 500. When the power detected by current sensor 162 and voltage sensor 164 exceed a predetermined value, vehicle ECU 300 can cause the DC output (power feed relay 160) to stop supply of the DC voltage.

With the configuration described above, vehicle ECU 300 can determine whether or not to feed power to external device 500, while monitoring electric power.

Hereinafter, control of power output to service receptacle 190 and control of power feed to external device 500 performed by vehicle ECU 300 will be described with reference to the flowcharts of FIGS. 2, 3, and 4.

Figure 2:
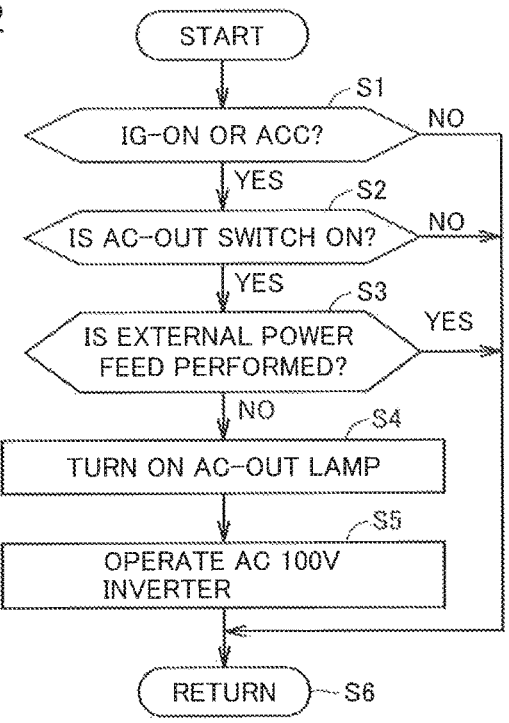
FIG. 2 is a flowchart for illustrating control of power output to a service receptacle 190 performed by a vehicle ECU 300.

FIG. 2 is a flowchart for illustrating control of power output to service receptacle 190 performed by vehicle ECU 300. The processing in the flowchart is invoked from a main routine and performed at regular time intervals or whenever predetermined conditions are satisfied.

Referring to FIGS. 1 and 2, in step S1, vehicle ECU 300 determines whether or not the operation mode of the vehicle is the IG-ON mode or the accessory mode. When the operation mode of the vehicle is the IG-ON mode or the accessory mode in step S1 (YES in S1), the processing proceeds to step S2.

In step S2, vehicle ECU 300 determines whether or not AC-OUT switch 222 is operated to an ON state. When AC-OUT switch 222 is operated to an ON state in step S2 (YES in S2), the processing proceeds to step S1.

In step S3, vehicle ECU 300 determines whether or not DC external power feed to external device 500 is currently performed. When DC external power feed is not performed in step S3 (NO in S3), vehicle ECU 300 turns on AC-OUT lamp 224 in step S4, and operates inverter 180 to supply AC 100V to service receptacle 190 in step S5.

On the other hand, when the operation mode is not any of the IG-ON mode and the accessory mode in step S1, when the AC-OUT switch is not operated to an ON state in step S2, or when DC external power feed is performed in step S3, the processing proceeds to step S6 without performing the processing in steps S4 and S5.

Since the processing in step S3 is performed, DC external power feed to the DC outlet may be given priority over AC in-vehicle power feed to service receptacle 190. Since DC external power feed may also be intended to be used in case of emergency such as a disaster and the like, DC external power feed can be set to have a higher priority than that of AC in-vehicle power feed. It should be noted that, in such a case, it is desirable to connect the AC electric apparatus to output 520 of external device 500 or to a branch from output 520, rather than connecting the AC electric apparatus to service receptacle 190.

Figure 3:
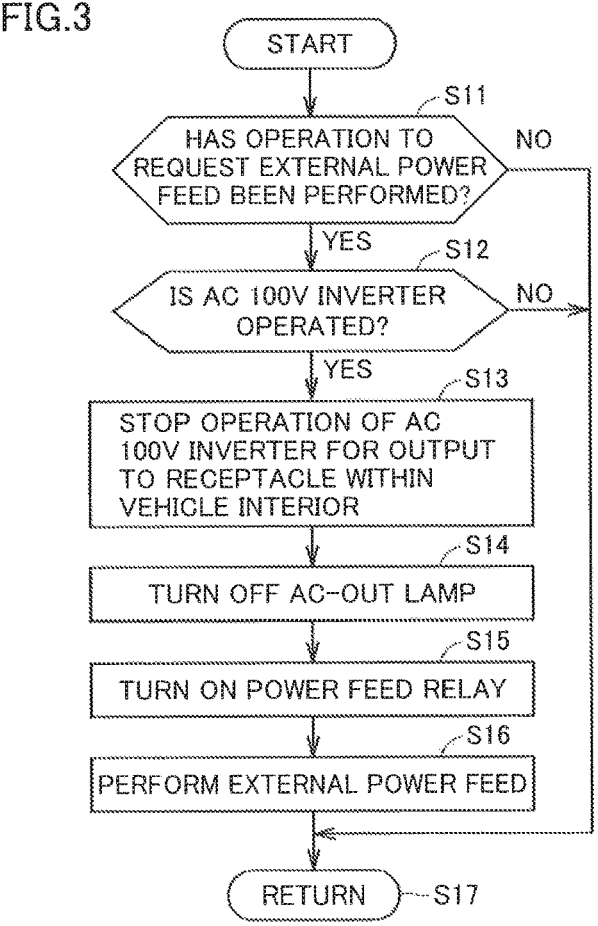
FIG. 3 is a flowchart for illustrating control of power feed to an external device 500 performed by vehicle ECU 300.

FIG. 3 is a flowchart for illustrating control of power feed to external device 500 performed by vehicle ECU 300. The processing in the flowchart is invoked from the main routine and performed at regular time intervals or whenever predetermined conditions are satisfied.

Referring to FIGS. 1 and 3, in step S11, vehicle ECU 300 determines whether or not an operation to request DC external power feed has been performed. In one example, vehicle ECU 300 determines that an operation to request DC external power feed has been performed when the external device is connected to DC outlet 170, and the operation mode of the vehicle is set to the IG-ON mode, and DC-OUT switch 220 is set to an ON state. It should be noted that, when vehicle ECU 300 communicates with power feed ECU 550 of external device 500, conditions that power feed start switch 542 is operated to an ON state, and that power feed stop switch 544 and emergency stop switch 546 are not operated may be added to the conditions described above.

When it is determined in step S11 that an operation to request DC external power feed has been performed, the processing proceeds to step S12. In step S12, vehicle ECU 300 determines whether or not inverter 180, which generates AC power of AC 100V, is in operation. When inverter 180 is in operation in step S12 (YES in S12), the processing proceeds to step S13. In step S13, vehicle ECU 300 stops the operation of inverter 180, which generates AC power of AC 100V to be output to service receptacle 190, and in step S14, vehicle ECU 300 turns off AC-OUT lamp 224. Thereby, even if the AC electric apparatus connected to service receptacle 190 fails to be turned off, for example, power supply to the AC electric apparatus may be interrupted.

It is conceivable that, in such a situation in which DC external power feed is performed, the AC electric apparatus is left for a long time in a state where no one is present within the vehicle interior. In the case of an electric apparatus including a heat source, such as a hair drier, a hot plate, or an electric rice cooker, for example, even if the electric apparatus is left within the vehicle interior, there is a reduced possibility that overheating or the like may occur, because power supply thereto may be interrupted.

Then, in step S15, power feed relay 160 is made conductive, and in step S16, DC external power feed to external device 500 is performed.

It should be noted that, when it is determined in step S11 that an operation to request DC external power feed has not been performed (NO in S11), or when it is determined in step S12 that inverter 180 is not in operation (NO in S12), control is returned to the main routine in step S17.

Since the controls shown in FIGS. 2 and 3 may give priority to external power feed over in-vehicle power feed, the controls can prevent that the AC electric apparatus connected to service receptacle 190 is operated in an inappropriate state during external power feed in which it is likely that no one is present within the vehicle interior.

Figure 4:
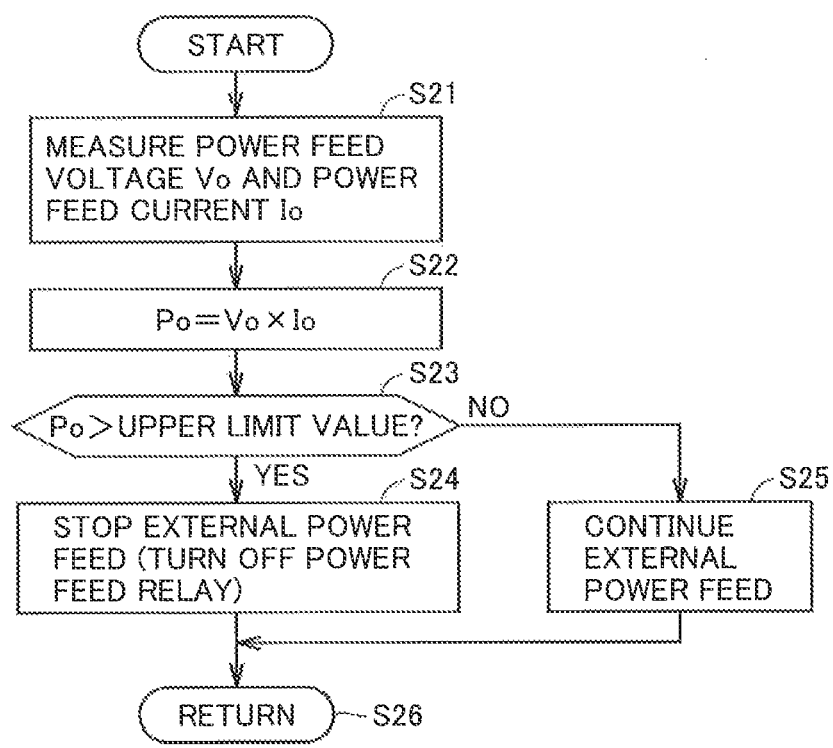
FIG. 4 is a flowchart for illustrating control of power monitoring during the power feed to external device 500 performed by vehicle ECU 300.

FIG. 4 is a flowchart for illustrating control of power monitoring during the power feed to external device 500 performed by vehicle ECU 300. The processing in the flowchart is invoked from the main routine and performed at regular time intervals or whenever predetermined conditions are satisfied, while power feed is performed in step S15 of FIG. 3.

Referring to FIGS. 1 and 4, in step S21, vehicle ECU 300 obtains a power feed voltage Vo from voltage sensor 164 and a power feed current Io from current sensor 162. Next, in step S22, vehicle ECU 300 calculates power feed power Po by computing the product of the current and the voltage.

Next, in step S23, vehicle ECU 300 determines whether or not power feed power Po exceeds an upper limit value. When Po exceeds the upper limit value in step S23 (YES in S23), the processing proceeds to step S24, and when Po does not exceed the upper limit value (NO in S23), the processing proceeds to step S25.

In step S25, DC external power feed is continued. On the other hand, in step S24, DC external power feed is stopped. In one example, the power feed relay is turned off. When the processing proceeds to step S26 after the processing in step S24 or S25, control is returned to the main routine.

DC external power feed power Po is limited by the upper limit value as shown in FIG. 4 in order to protect the vehicle, protect the external device, and the like. For example, when vehicle-mounted battery 110 is designed to have as small capacity as possible in order to suppress the cost of vehicle-mounted battery 110, there may also be a case where, while AC in-vehicle power feed is performed, the upper limit value can be modified to be stricter.

If electric power is output from the AC output (inverter 180) to the AC electric apparatus during the power feed to external device 500 in a case where such control is performed, external device 500 in operation may be stopped due to the limited electric power. With the controls which may give priority to DC external power feed over AC in-vehicle power feed as described in FIGS. 2 and 3, during the power feed from DC outlet 170 to external device 500, even if a request to supply electric power to the AC electric apparatus connected to service receptacle 190 is made later, the requested electric power may not be supplied to the AC electric apparatus. Accordingly, this can avoid a situation in which external device 500 is stopped.

It should be noted that, although the present embodiment has described an example in which a service receptacle for AC power feed is provided within a vehicle interior, and a DC outlet is provided to feed power to the outside of a vehicle, it is satisfactory as long as power feed to the outside of the vehicle is given priority over power feed to within the vehicle interior. For example, the service receptacle provided within the vehicle interior may be any of a service receptacle for AC power feed and a service receptacle for DC power feed, and the outlet performing power feed to the outside of the vehicle may also be any of an outlet for AC power feed and an outlet for DC power feed.

Although FIG. 1 shows separate units for PCU 120 and vehicle ECU 300, PCU 120 and vehicle ECU 300 may be part of a single ECU.

Although one or more embodiments of the present disclosure have been described, it should be understood that any embodiments disclosed herein are illustrative and non-restrictive.

What is claimed is:

1. A power source device for a vehicle, comprising:
a power source;
a first connector for feeding power from said power source to an external device external to the vehicle;
a second connector provided, within a vehicle interior, separately from said first connector;
an AC output which receives voltage of said power source to generate AC voltage, and outputs the AC voltage to said second connector;
an operator by which a user requests power feed from said first connector to said external device; and
an electronic control unit which controls power supply from said power source to said first connector and said second connector, wherein
when said electronic control unit receives, from said operator, an input requesting the power feed to said external device, and when the AC output is in operation, said electronic control unit stops generation of the AC voltage by the AC output and performs the power supply to said first connector, and
the input requesting the power feed to said external device is not from said external device.

2. The power source device for a vehicle according to claim 1, wherein, during the power feed from said first connector to said external device, said electronic control unit further disables power supply from said second connector even if said electronic control unit receives, from said operator, a request to use said second connector.

3. The power source device for a vehicle according to claim 2, wherein
said power source is a DC power source,
the power source device for the vehicle further comprises:
a DC output which receives voltage of said DC power source and outputs DC voltage for power feed to said first connector,
said AC output includes an inverter,
said DC output includes a power feed relay which connects said DC power source and said first connector, and
when said electronic control unit receives, from said operator, the input requesting the power feed to said external device, said electronic control unit stops an operation of said inverter and makes said power feed relay conductive.

4. The power source device for a vehicle according to claim 1, further comprising a power detector which detects power supplied from said first connector to said external device, wherein
when the power detected by said power detector exceeds a predetermined value, said electronic control unit limits power supply from said first connector.

5. The power source device for a vehicle according to claim 4, wherein
said power source is a DC power source,
the power source device for the vehicle further comprises:
a DC output which receives voltage of said DC power source and outputs DC voltage for power feed to said first connector,
said AC output includes an inverter,
said DC output includes a power feed relay which connects said DC power source and said first connector, and
when said electronic control unit receives, from said operator, the input requesting the power feed to said external device, said electronic control unit stops an operation of said inverter and makes said power feed relay conductive.

6. The power source device for a vehicle according to claim 1, wherein
said power source is a DC power source,
the power source device for the vehicle further comprises:
a DC output which receives voltage of said DC power source and outputs DC voltage for power feed to said first connector,
said AC output includes an inverter,
said DC output includes a power feed relay which connects said DC power source and said first connector, and
when said electronic control unit receives, from said operator, the input requesting the power feed to said external device, said electronic control unit stops an operation of said inverter and makes said power feed relay conductive.

7. The power source device for a vehicle according to claim 1, wherein said power source includes
a secondary battery, and
a fuel cell for charging said secondary battery.

8. The power source device for a vehicle according to claim 1, wherein
said operator includes a first switch and a second switch,
a user requests power feed from said first connector to said external device by setting said first switch to an ON state, and
a user requests power feed from said second connector by setting said second switch to said ON state.

* * * * *